(12) United States Patent  (10) Patent No.: US 8,365,382 B2
Hedström  (45) Date of Patent: Feb. 5, 2013

(54) METHOD OF FORMING A CLAMPING RING AND A CLAMPING RING

(75) Inventor: Bengt Hedström, Västerås (SE)

(73) Assignee: Uponor Innovation AB, Virsbo (SE)

( * ) Notice: Subject to any disclaimer, the term of this patent is extended or adjusted under 35 U.S.C. 154(b) by 379 days.

(21) Appl. No.: 12/667,453

(22) PCT Filed: Jul. 2, 2007

(86) PCT No.: PCT/IB2007/052555
§ 371 (c)(1),
(2), (4) Date: Apr. 27, 2010

(87) PCT Pub. No.: WO2009/004407
PCT Pub. Date: Jan. 8, 2009

(65) Prior Publication Data
US 2010/0199469 A1  Aug. 12, 2010

(51) Int. Cl.
*B23P 19/00* (2006.01)
(52) U.S. Cl. ............ 29/417; 29/506; 29/507; 29/508
(58) Field of Classification Search ........... 285/381.4, 285/381.5, 242, 256; 29/412, 506, 507, 508, 29/511, 510, 417
See application file for complete search history.

(56) References Cited

U.S. PATENT DOCUMENTS

| 4,305,608 A | * | 12/1981 | Stuemky et al. ......... 285/256 |
| 5,735,554 A | | 4/1998 | Imgam |
| 6,162,383 A | * | 12/2000 | Hane et al. .............. 29/446 |
| 8,146,225 B2 | * | 4/2012 | Olinger et al. ........... 29/417 |
| 2007/0284877 A1 | | 12/2007 | Glinzerer |

FOREIGN PATENT DOCUMENTS

| DE | 4025840 | 2/1992 |
| DE | 4344798 | 6/1995 |
| DE | 202006008069 | 8/2006 |
| EP | 0530387 | 3/1993 |
| EP | 1741968 | 1/2007 |
| JP | 2006-289857 | 10/2006 |
| WO | WO 93/05332 | 3/1993 |
| WO | WO 96/41985 | 12/1996 |
| WO | WO 2007/006863 | 1/2007 |
| WO | 2008/023351 | 2/2008 |

* cited by examiner

*Primary Examiner* — David E Bochna
(74) *Attorney, Agent, or Firm* — Occhiuti Rohlicek & Tsao LLP

(57) ABSTRACT

A pipe from a plastic material having memory properties is extruded. The extruded pipe is cut to form a pipe part (7). The pipe part (7) is warmed and the end (6b) of the pipe part (7) is bent. The pipe part (7) forms a clamping ring (6) and the bent end (6b) of the pipe part (7) forms a stop edge (10) in the clamping ring (6).

3 Claims, 2 Drawing Sheets

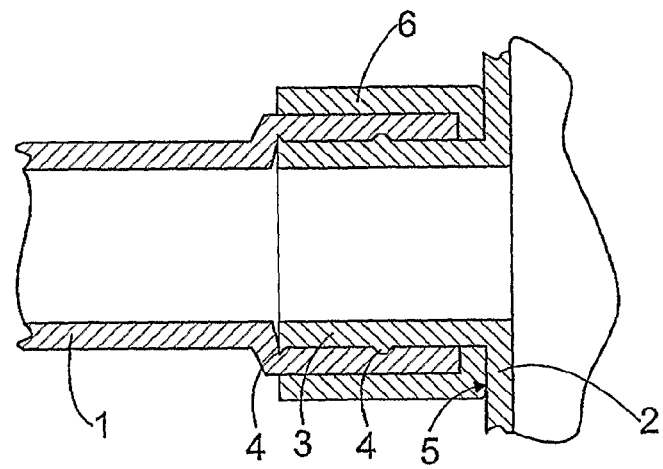
FIG. 1
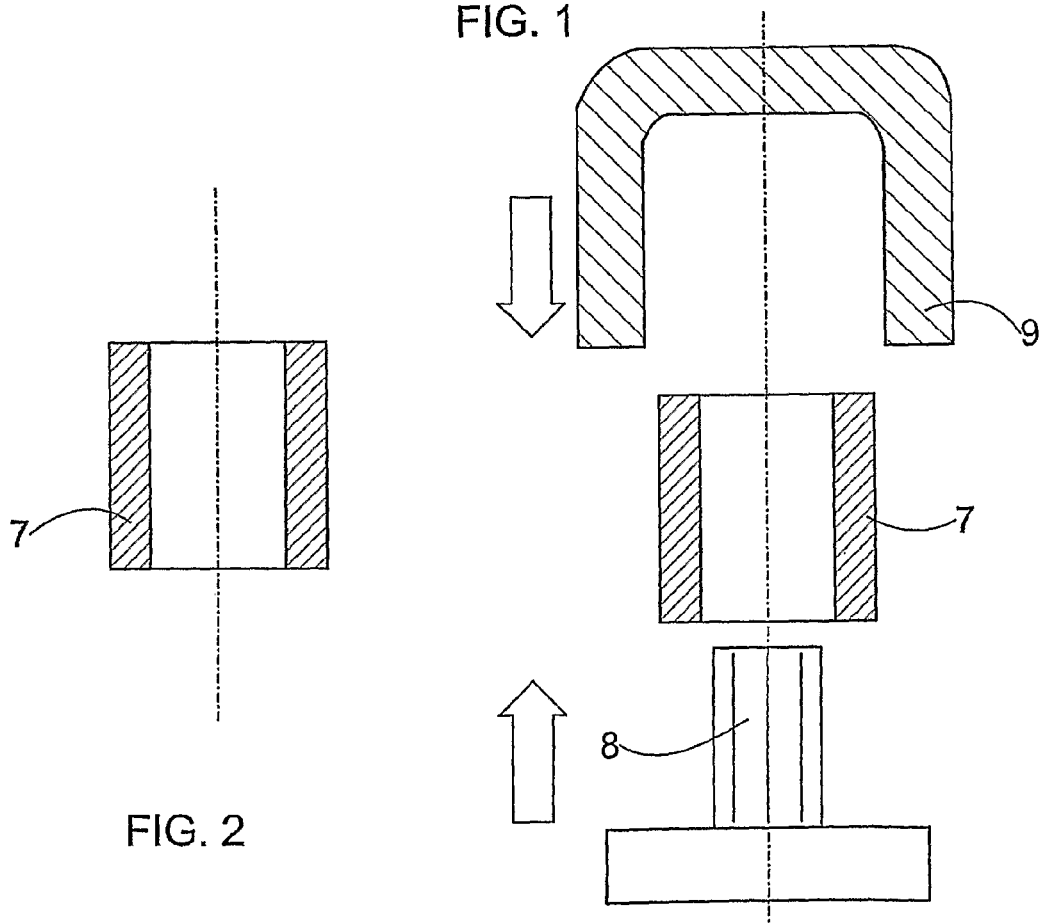
FIG. 2
FIG. 3

METHOD OF FORMING A CLAMPING RING AND A CLAMPING RING

CROSS-REFERENCE TO RELATED APPLICATIONS

This application is the National Stage of International Application No. PCT/IB2007/052555, filed on Jul. 2, 2007. The contents of the application is hereby incorporated by reference in its entirety.

BACKGROUND OF THE INVENTION

The invention relates to a method of forming a clamping ring, the method comprising: extruding a pipe from a plastic material having memory properties, and cutting the extruded pipe to form a pipe part.

Further, the invention relates to a clamping ring that is formed from an extruded pipe by cutting the pipe into a short enough pipe part.

It is known to provide a pipe connection between one end of a pipe made of a plastic material that has memory properties and a connecting piece. The memory properties mean that plastic pipes with a memory capacity automatically strive to return essentially to their original shape and form after having been expanded. For example plastic pipes that are manufactured from cross-linked polyethylene possess an active memory capacity at temperatures as low as room temperature. Pipes of this nature are joined together by widening one end of the pipe and inserting into the widened pipe-end a flanged connector which forms a part of the pipe connecting piece, normally made of metal, and which is retained in said pipe-end until the pipe has shrunk to an extent at which it is able to firmly hold the connecting piece. A clamping ring made of elastic material, which may be the same plastic material as that from which the pipe is made, is expanded and shrunk over the pipe end, in order to further enhance the holding and sealing pressure at the pipe connection region. The clamping ring is expanded at the same time as the pipe-end is expanded, with the clamping ring in position around said pipe-end. Such a solution has been disclosed for example in EP 0 530 387. In EP 0 530 587 the clamping ring has been made from an extruded pipe by cutting the pipe into a short enough part to form a clamping ring. In EP 1 741 968 the clamping ring is made by injection molding.

BRIEF DESCRIPTION OF THE INVENTION

The object of the invention is to provide a new method of forming a clamping ring and a new clamping ring.

The method of the invention is characterized by warming the pipe part and bending the end of the pipe part such that a clamping ring having a stop edge is formed.

Further, the clamping ring of the invention is characterized in that the end of the pipe part is bent such that the end of the pipe part forms a stop edge in the clamping ring.

In the invention a pipe is extruded. The extruded pipe is cut to form a pipe part. The pipe part is warmed and the end of the pipe part is bent. The pipe part forms a clamping ring and the bent end of the pipe part forms a stop edge in the clamping ring. Preferably, the bending of the end of the pipe part is performed by widening the body part of the pipe part and preventing the end of the pipe part from widening. It is simple and easy to make such a clamping ring. Although the clamping ring is simple it is provided with a stop edge. The stop edge ensures that the clamping ring remains positioned at a correct position on the pipe end when a pipe connection is being made and after the pipe connection has been made.

BRIEF DESCRIPTION OF THE FIGURES

In the following, the invention will be described in greater detail by means of preferred embodiments with reference to accompanying drawings, in which FIG. 1 schematically shows a pipe connection in cross-section, and FIGS. 2, 3, 4, 5, and 6 are schematic cross-section of views showing different stages of a method of forming a clamping ring.

DETAILED DESCRIPTION OF THE INVENTION

Figure 4:
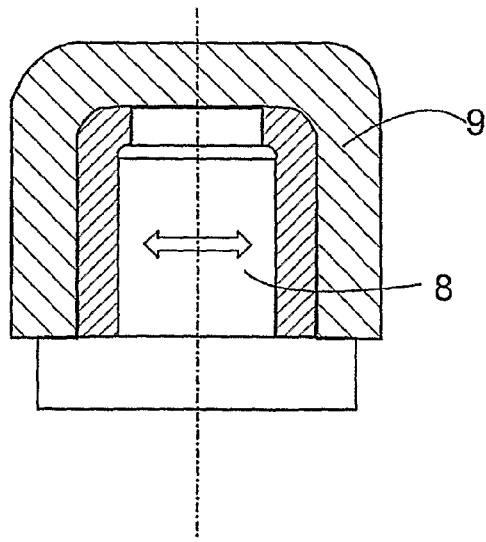

FIG. 1 shows a pipe 1, which is comprised of a plastic material having memory properties, for instance a cross-linked polyethylene PEX or any other cross-linked polyolefin, and a connecting piece 2 made of metal. The connecting piece 2 comprises a nipple end 3. The nipple end 3 comprises radially projecting flanges 4. The nipple end 3 is terminated with a radial abutment surface 5.

The nipple end 3 has an outer diameter which exceeds the inner diameter of the unexpanded pipe 1. An elastic clamping ring 6 is mounted on an end of the pipe 1. In its relaxed state, the clamping ring 6 has an inner diameter which corresponds to the outer diameter of the unexpanded pipe 1.

When establishing the pipe connection shown in FIG. 1, the end of pipe 1 and the surrounding clamping ring 6 are expanded simultaneously by an expander tool. The nipple end 3 is then immediately inserted into the end of the pipe until the abutment surface 5 is in abutment with the end of the pipe 1 and with the clamping ring 6. The end of the pipe 1 and the clamping ring 6 then shrink or contract automatically, so as to obtain a sealing contact between the inner surface of the pipe and the flange in particular. The sealing contact is also obtained between the inner surface of the pipe 1 and the outer surface of the nipple end 3.

FIGS. 2 to 6 show the steps of forming a clamping ring. First, a pipe is extruded. Preferably the pipe is made from cross-linked polyethylene PEX or any other plastic material having memory properties. The pipe is then cut into a short enough part to form a clamping ring, such that a pipe part 7 shown in FIG. 2 is formed.

The pipe part 7 is warmed up at a temperature of 135° C.-150° C. The pipe part 7 is positioned into a mold as shown in FIG. 3. The mold comprises a collapsible cylinder 8 which is positioned inside the pipe part 7 and an outer mold 9. The pipe part 7 can be warmed up, for example, in the mold. In FIG. 3 the collapsible cylinder 8 is in its collapsed state.

The pipe part 7 is expanded with the collapsible cylinder 8 as shown in FIG. 4. The length of the cylinder 8 is somewhat shorter than the length of the pipe part 7. The length of the cylinder may vary from 2 to 5 cm, for example, when the diameter of the pipe part 7 varies from 2 to 5 cm, for example. The length of the pipe part is for example 3 to 10 mm longer than the length of the cylinder 8. Thus, the cylinder 8 expands the body part 6a of the pipe part 7, whereas the end 6b of the pipe part 7 remains unexpanded. The outer mold 9 prevents the end 6b of the pipe part 7 from widening. Thus, the end 6b of the pipe part 7 forms a stop edge 10 as shown in FIG. 6.

Figure 5:
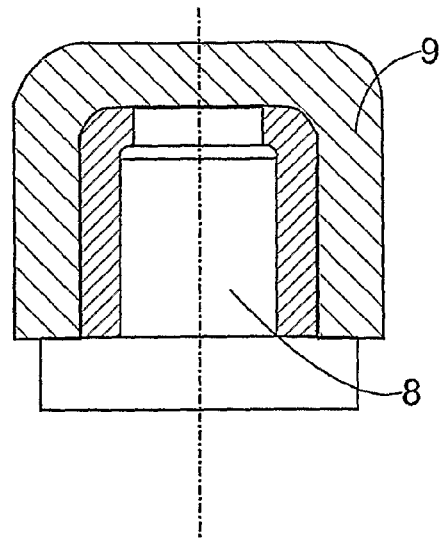

FIG. 5 describes cooling of the pipe part 7 to a temperature of approximately 20° C.

Figure 6:
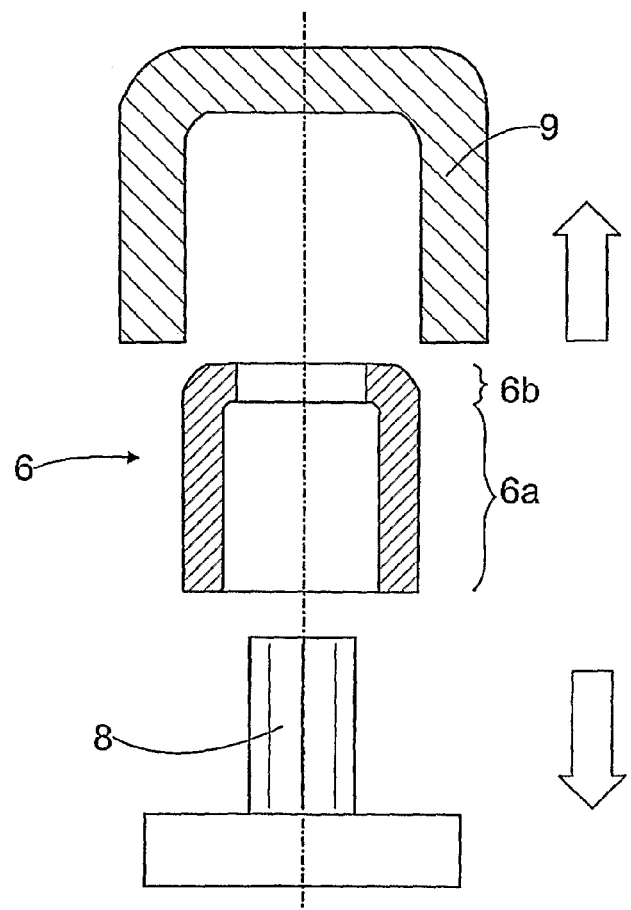

FIG. 6 describes opening of the mold when the clamping ring 6 with the stop edge 10 is ready.

It is obvious to a person skilled in the art that in the course of technical progress, the basic idea of the invention may be carried out in numerous ways. Thus, the invention and its embodiments are not limited to the previous examples, but they may vary within the scope of the appended claims.

The invention claimed is:

1. Method of forming a clamping ring, the method comprising:
   extruding a pipe from a plastic material having memory properties,
   cutting the extruded pipe to form a pipe part, warming the pipe part and bending the end of the pipe part such that a clamping ring having a stop edge is formed, wherein the bending of the end of the pipe part is performed by widening the body part of the pipe part and by preventing the end of the pipe part from widening.

2. A method according to claim 1, wherein
   the widening of the body part of the pipe part is made by means of a collapsible cylinder positioned in the pipe part, the length of the cylinder being shorter than the length of the pipe part.

3. A method according to claim 2, further comprising
   positioning an outer mold on the pipe part before widening the body part of the pipe part.

* * * * *